United States Patent [19]

Lindgren

[11] Patent Number: 4,638,831
[45] Date of Patent: Jan. 27, 1987

[54] VALVE ARRANGEMENT FOR UNLOADING LIQUID FLOW AT A NON-RETURN VALVE

[75] Inventor: Nils E. Lindgren, Borlänge, Sweden
[73] Assignee: SSAB Svenskt Stål AB, Stockholm, Sweden
[21] Appl. No.: 828,758
[22] PCT Filed: Apr. 26, 1985
[86] PCT No.: PCT/SE85/00189
   § 371 Date: Dec. 24, 1985
   § 102(e) Date: Dec. 24, 1985
[87] PCT Pub. No.: WO85/05430
   PCT Pub. Date: Dec. 5, 1985

[30] Foreign Application Priority Data
May 11, 1984 [SE] Sweden ................... 8402542

[51] Int. Cl.⁴ .............................. G05D 7/01
[52] U.S. Cl. ........................ 137/117; 417/299
[58] Field of Search ............. 137/116, 117; 417/299

[56] References Cited
U.S. PATENT DOCUMENTS
3,358,705 12/1967 Krechel ..................... 137/116
3,976,090 8/1976 Johnson .................... 137/117
4,321,940 3/1982 Krechel .................. 417/299 X FOREIGN PATENT DOCUMENTS
2519026 11/1975 Fed. Rep. of Germany.
1488447 10/1977 United Kingdom .......... 417/299

Primary Examiner—Robert G. Nilson
Attorney, Agent, or Firm—Watson, Cole, Grindle & Watson

[57] ABSTRACT

A minimum flow valve device includes a housing providing a liquid passageway therethrough having an inlet end and an outlet end; a guide element mounted in the liquid passageway which provides an internal chamber that is open towards the inlet end of the liquid passageway, the guide element including a discharge orifice communicating with the internal chamber; an unloading pipe extending through the housing and communicating with the discharge orifice; an annular non-return valve element; and a valve sleeve member connected to the non-return valve element and extending within the internal chamber. The valve sleeve member includes orifices such that when the non-return valve element and the valve sleeve member are positioned to block liquid flow through the liquid passageway, liquid will flow through the discharge orifice and out the unloading pipe.

6 Claims, 2 Drawing Figures

VALVE ARRANGEMENT FOR UNLOADING LIQUID FLOW AT A NON-RETURN VALVE

BACKGROUND OF THE INVENTION

The present invention relates to a valve arrangement for obtaining an unloading liquid flow for cooling a centrifugal pump or the like even when working against a closed supply pipe. The arrangement includes a valve housing containing a non-return valve, the respective closing and opening movement of the non-return valve causing a respective opening and closing of an unloading orifice in the valve housing, such that an unloading liquid flow will be obtained even when the non-return valve is in a closed position within the valve housing.

THE PRIOR ART

Valve arrangements of the noted type, which are also called minimum flow valves, are used to protect centrifugal pumps from overheating when working against a closed supply pipe, for instance a supply pipe for used delivery water to one or more consumers. The fact that a pump is working against a closed supply pipe may be due to the fact that this pipe is connected to a number of independent users, who at any given time may not be using the no water available in the pipe. However, the pump cannot be stopped just because at any given time the water being supplied thereby is not being tapped. As such, the pump will work against a closed non-return valve in the supply pipe with the same water, such that the cooling effect of the water which normally flows through the pump will be reduced, thus causing damage to the pump bearings. This phenomenon will also occur when several pumps are connected in parallel, as the tightest pump will close the non-return valves of the other pumps when there is a low flow in the supply pipe. Empirically it is known that a centrifugal pump for instance must have a flow of about 10% of its whole capacity to cool down the loss of heat arising in the pump when working. Centrifugal pumps for pumping hot water are particularly sensitive to overheating when there is a low flow therethrough or closed valves. In such cases, the pump may also be damaged by hot-water evaporation.

It is well-known that an unloading liquid flow from a non-return valve can be obtained by making its movement govern a special valve so that the unloading valve will be opened when the non-return valve is moved to a closed position. One example of such a valve arrangement includes a lever which is connected to the non-return valve such that, when the non-return valve is moved to a closed position within the housing, the lever will cause the valve body to turn so that a connection will be obtained between the pressure side of the valve housing and an unloading orifice in this housing. The unloading pipe may also be provided with a non-return valve. When having great pressure differences, there are also throttlings arranged in the unloading pipe. The well-known valve arrangement, however, is impaired by the disadvantage of containing several movable parts, bringing about high cost of production and a comparatively unsafe operational reliability.

DETAILED DESCRIPTION OF THE INVENTION

The object of this invention is to provide a minimum flow valve not having the drawbacks of the well-known valves. The object was not obtained by means of a valve arrangement including a valve housing encasing a non-return valve, by the movement of which when respectively closing and opening, a connection will be respectively opened and closed to an unloading orifice in the valve housing, by which a predetermined liquid flow will be obtained when the non-return valve is closed. The invention is characterized in that the non-return valve is connected to a valve sleeve member which is linearly displaceable in a guide element; that the valve sleeve member is provided with an interior duct being in contact with an orifice to the pipe pressure side on one hand, an orifice on the outer sliding surface of the valve sleeve member on the other; that the guide element is provided with a tight plate and in fixed contact with an orifice on its interior sliding surface being in contact with the unloading orifice; and that the sleeve orifice is in contact with the guide element orifice when the non-return valve is in a closed position.

The valve sleeve member especially consists of a cylinder-shaped pipe, the one end of which projects through the non-return valve. The guide element exhibits a corresponding cylinder-shaped sliding surface, which may also include packings sealing to the outer sliding surface of the valve sleeve member. A spring, preferably a helical spring, is placed inside the pipe duct of the valve sleeve member so as to transfer a compressive force between the guide element and the non-return valve. The spring force is adjusted to give the non-return valve a normal function when respectively opening and closing the supply pipe.

The valve housing especially consists of a cylinder-shaped pipe casing provided with a pipe flange at each end. The unloading orifice consists of a pipe mounted to the pipe casing on one hand, to the guide element at its sliding surface orifice on the other, so that this orifice will open out into the unloading pipe. The non-return valve is sealing engageable with a ring-shaped seat inserted through an opening in the one pipe flange of the valve housing, i.e., the pipe flange which is designed to be connected to the pipe pressure side. The valve sleeve member with the non-return valve may be removed from the valve housing through the orifice in the pipe flange after the valve seat has been removed from the pipe flange.

The unloading valve according to the invention has only one movable part, that being the valve sleeve member with the non-return valve. In this way, it is much simpler and much more reliable in running than the well-known minimum flow valves mentioned above. Furthermore, the valve according to the invention will permit a production from semi-finished standard products, e.g., pipes and sheet metal.

DETAILED DESCRIPTION OF THE PREFERRED EMBODIMENT

Figure 1:
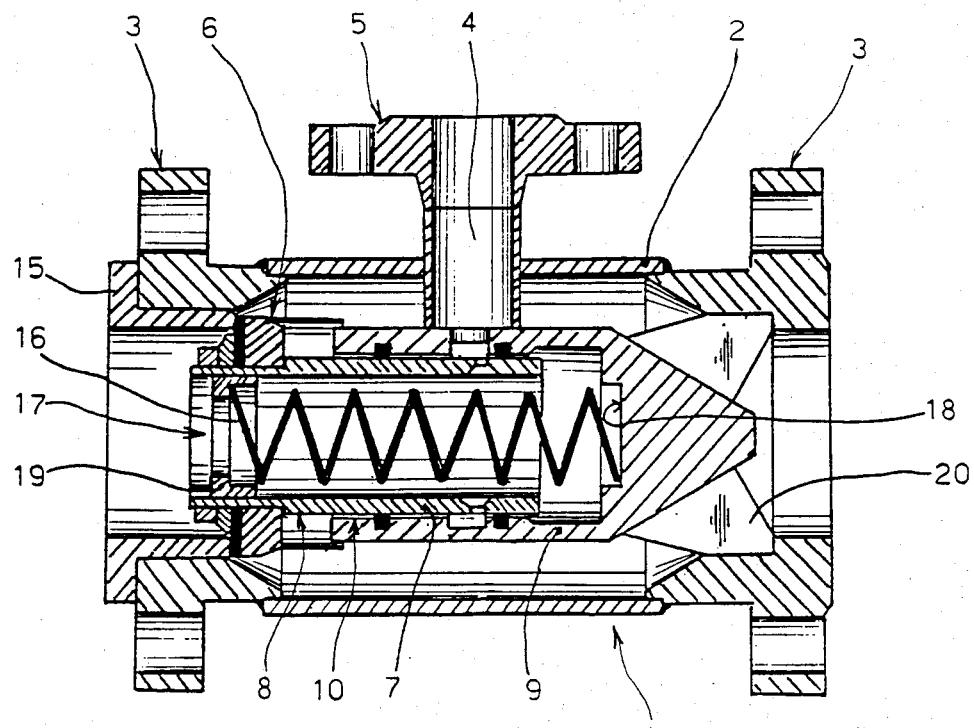
FIG. 1 shows a longitudinal section of the valve arrangement according to a preferred embodiment of the present invention wherein the non-return valve is in a closed position and an unloading flow is provided.

The valve arrangement according to FIG. 1 includes a valve housing (1) consisting of a cylinder-shaped pipe casing (2) provided with a pipe flange (3) at each end.

Each pipe flange (3) is of a well-known construction and designed for installation, e.g., into a supply pipe (not shown in the figures) which is provided with corresponding flanges. One unloading pipe (4) is welded into the pipe casing (2) so as to project out from this, and is provided with a connecting flange (5) to an unloading pipe.

A non-return valve 6 is mounted to a cylinder-shaped tubular valve sleeve member, 7, provided with an outer sliding surface, 8, and is linearly displaceable along the centre line of the valve housing, 1, inside a guide element, 9 provided with a corresponding interior sliding surface, 10. On the sliding surface, 10, of the guide element, 9, there are packings, 11, arranged so as to extend between the two sliding contact surfaces, 8, and 10, on each side of a ring-shaped groove (12) on the interior sliding surface, 10, of the guide element, 9. The outer sliding surface, 8, of the valve sleeve member, 7, is provided with a number of diametrically arranged orifices, 13, being at the ring-shaped groove, 12, in the guide element, 9, when the non-return valve, 6, is closed, and inside the interior packing, 11, in the guide element, 9, when the non-return valve, 6, is open. Moreover, the guide element, 9, is provided with a waste orifice, 14, on the interior sliding surface, 10, at the groove, 12, being in contact with the unloading pipe, 4, which is welded around the waste orifice, 14.

The non-return valve, 6, can be sealingly engaged with a ring-shaped seat, 15, inserted through an opening in the one pipe flange, 3, of the valve housing, 1 which is designed to be connected to the pressure side of the supply pipe. A helical spring, 16, is mounted inside the pipe duct, 17, of the valve sleeve member, 7, so as to transfer a compressive force between the back plate, 18, of the guide element, 9, and the valve sleeve member, 7, with the non-return valve, 6, resting against a ring-shaped shelf, 19, mounted inside the pipe duct, 17, of the valve sleeve member, 7. The back plate, 18, of the guide element, 9, is provided with a structural support, 20, resting against the pipe flange, 3, on the outlet side of the valve housing, 1. In this way most of the power of the helical spring, 16, will be transferred between the two pipe flanges, 3.

The non-return valve, 6, consists of a ring-shaped valve cone, 21, provided with a seal, 22, mounted on a level perpendicular to the longitudinal direction of the valve housing, 1. The seal, 22, is sealing to a correspondingly flat surface on the ring-shaped seat, 15, in the valve housing, 1. The inside edge of the valve cone, 21, rests against a shelf on the valve sleeve member, 7, and the valve cone, 21, is fixed by means of a nut mounted via a thread to the front end of the valve sleeve member, 7.

Figure 2:
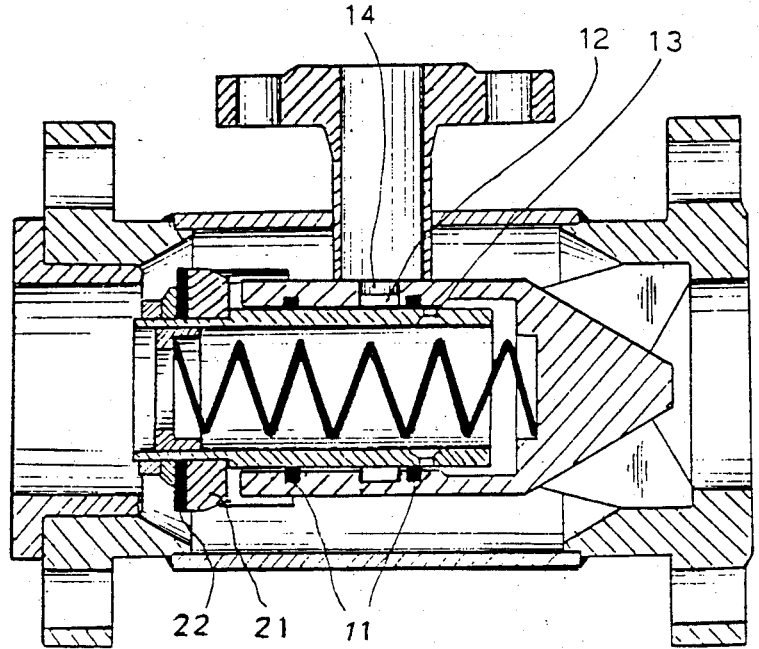
FIG. 2 shows the valve arrangement according to FIG. 1 but wherein the non-return valve is in an open position and no unloading flow is provided.

When the non-return valve, 6, is in a closed position (FIG. 1), the orifices, 13, in the valve sleeve member, 7, are in contact with the orifice, 14, in the sleeve covering, 9. A flow is obtained (FIG. 1) via the pipe duct, 17, of the valve sleeve member, 7, and out through the unloading pipe, 4. When the non-return valve is in a open position (FIG. 2), the orifices, 13, in the valve sleeve member, 7, are inside the interior packing, 11, of the guide element, 9, and then the connection between the pipe duct, 17, and the unloading pipe, 4, is closed.

I claim:

1. A minimum flow valve device which can be used in a fluid line connected to an operating centrifugal pump to supply cooling liquid thereto even when the fluid flow through the line is stopped, said valve device comprising a housing which provides a liquid passageway therethrough, said liquid passageway having an inlet end and an outlet end and defining a center line therethrough, an elongated guide element fixedly positioned in said liquid passageway in said housing so as to be aligned with said center line, said guide element including a sleeve portion nearest said inlet end of said liquid passageway and an end portion nearest said outlet end of said liquid passageway, said sleeve portion and said end portion defining an internal chamber which is open towards said inlet end and closed towards said outlet end of said liquid passageway; said sleeve portion having an outer surface and an inner sliding surface, an annular groove which is open towards said internal chamber and a discharge orifice which extends from said annular groove to said outer surface, an unloading pipe which extends through said housing and connects with the outer surface of said sleeve portion of said guide element so as to communicate with said discharge orifice, a non-return valve element which is movably positioned in said liquid passageway between said guide element and the inlet end of said liquid passageway, and a valve sleeve member which is connected to said non-return valve element and is movable within said internal chamber of said guide element, said valve sleeve providing an internal channel therein and having an outer sliding surface which is slidingly movable with respect to the inner sliding surface of the sleeve portion of said guide element and a plurality of orifices which extend therethrough in a common radial place; said non-return valve element and said valve sleeve being jointly movable back and forth from a first position where they block liquid flow through said liquid passageway to a second position where they allow liquid flow through said liquid passageway, said orifices in said valve sleeve being in communication with said annular groove in the sleeve portion of said guide element only when said non-return valve element and said valve sleeve member are in their first position, thus enabling liquid to flow from said inlet end of said liquid passageway, through said interior channel, through said discharge orifice and through said unloading pipe.

2. The minimum flow valve device according to claim 1, wherein said non-return valve element has annular shape, wherein said valve sleeve member is in the form of a tube which extends within said annular non-return valve element, and wherein a spring is mounted between said valve sleeve member and said guide element to bias said valve sleeve member and said non-return valve element into said first position.

3. The minimum flow valve device according to claim 1, wherein said housing includes a tubular pipe casing having opposite ends and a flange element at each of said opposite ends, and wherein said unloading pipe extends through said tubular pipe casing.

4. The minimum flow valve device according to claim 3, wherein said housing includes a ring-shaped seat element extending into one of said flange elements, said annular non-return valve element contacting said ring-shaped seat element when said annular non-return valve element and said valve sleeve member are in said first position.

5. The minimum flow valve device according to claim 4, wherein said annular non-return valve element has an outer diameter such that, together with said valve seat member, it can be removed from within said housing when said ring-shaped seat element is removed from within its associated flange element.

6. The minimum flow valve device according to claim 1, wherein said sleeve portion of said guide element includes packing seals extending from its inner sliding surface into said internal chamber so as to seal against the outer sliding surface of said valve sleeve member.

* * * * *